United States Patent

[11] 3,558,107

| [72] | Inventor | William Thomas Williams<br>Broomham, Catsfield, near Battle, Sussex,<br>England |
|---|---|---|
| [21] | Appl. No. | 748,470 |
| [22] | Filed | July 29, 1968 |
| [45] | Patented | Jan. 26, 1971 |

[54] FOAMING AGENT MIXER AND METHOD
5 Claims, 4 Drawing Figs.

[52] U.S. Cl. .................................................. 259/148,
259/6, 259/105
[51] Int. Cl. .................................................. B28c 5/12
[50] Field of Search ........................................... 259/21, 19,
5, 6, 105, 97, 40, 41, 178, 179, 148, 146, 147, 149

[56] References Cited
UNITED STATES PATENTS

| 1,478,073 | 12/1923 | Kuren | 259/6 |
| 1,796,659 | 3/1931 | Moyer | 259/179 |
| 2,716,544 | 8/1955 | Exley | 259/10 |
| 2,989,291 | 6/1961 | Bedner | 259/178X |
| 3,138,167 | 6/1964 | Fisher | 259/9X |
| 3,220,954 | 11/1965 | Malbe | 259/108 |
| 3,352,543 | 11/1967 | Niederman | 259/105X |

*Primary Examiner*—Robert W. Jenkins
*Attorney*—William Anthony Drucker

ABSTRACT: A mixing apparatus comprising a casing containing two rotatably mounted helices one within the other and means for rotating the helices, that the arrangement being such that as they rotate the axial distance between adjacent points on the helices continuously varies.

PATENTED JAN 26 1971 3,558,107

FOAMING AGENT MIXER AND METHOD

This invention relates to mixing apparatus and method of mixing and is especially although not solely suitable for mixing water with an aerating or foaming agent and if desired also with sand and cement.

According to the invention a mixing apparatus comprises a casing containing two rotatably mounted helices one within the other and means for rotating the helices, the arrangement being such that as they rotate the axial distance between adjacent points on the helices continuously varies.

A constructional form of the invention will be described by way of example with reference to the accompanying drawings wherein.

Figure 1:
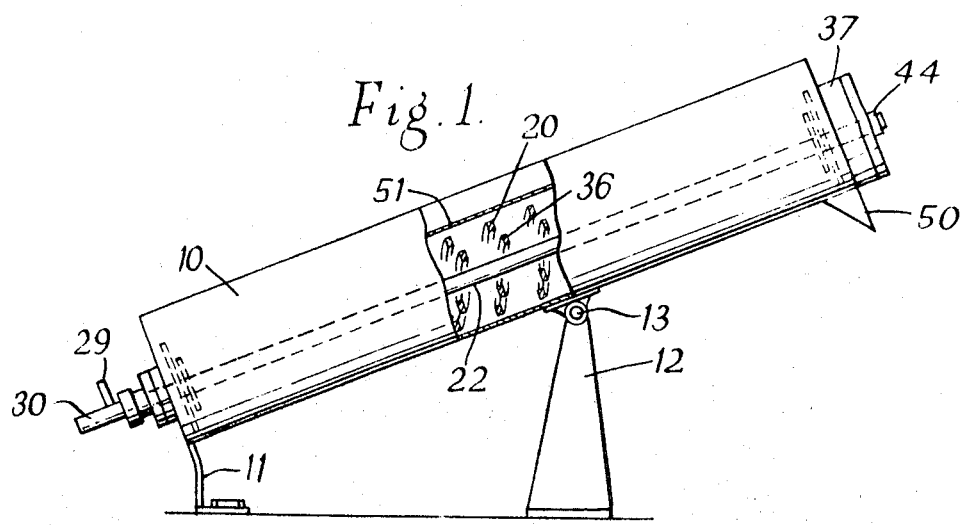
FIG. 1 is an elevational view of an apparatus made in accordance with the invention, a part being broken away to show interior parts.
Figure 2:
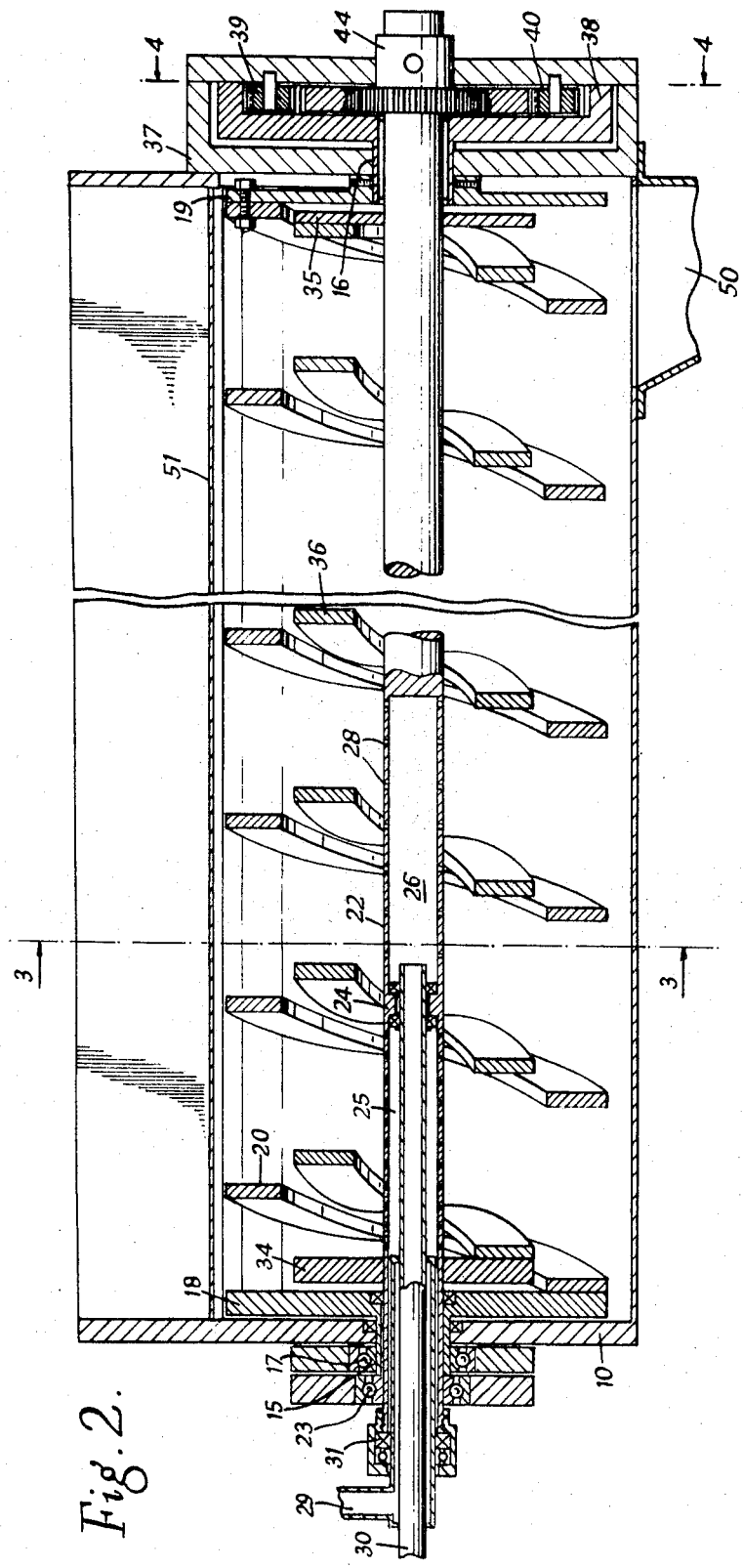
FIG. 2 is a longitudinal sectional view thereof on the line 2–2 on FIG. 4.
Figure 3:
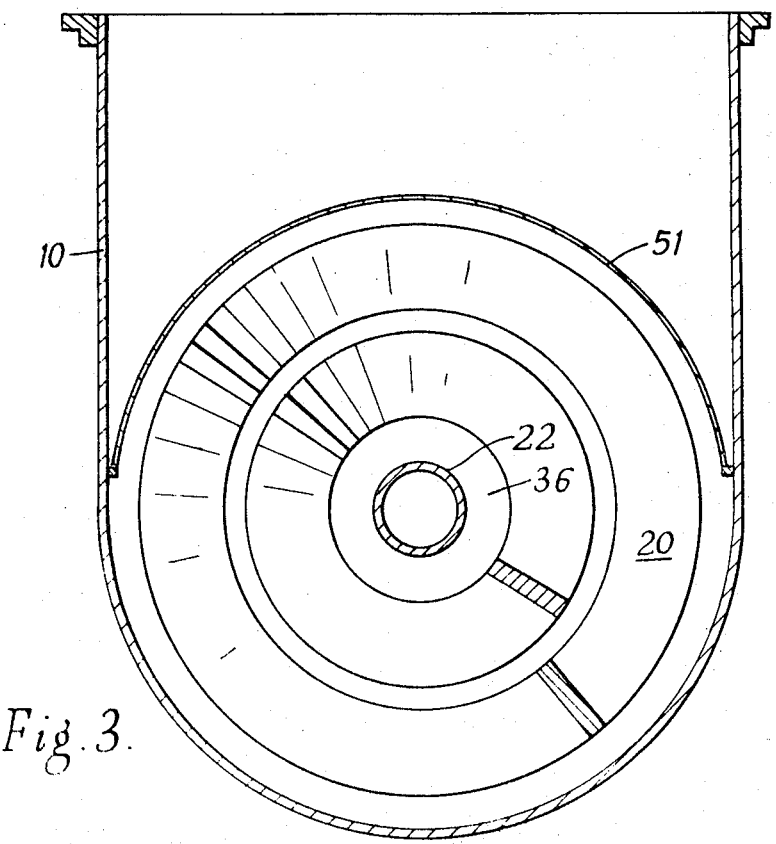
FIG. 3 is a section on the line 3–3 on FIG. 2.
Figure 4:
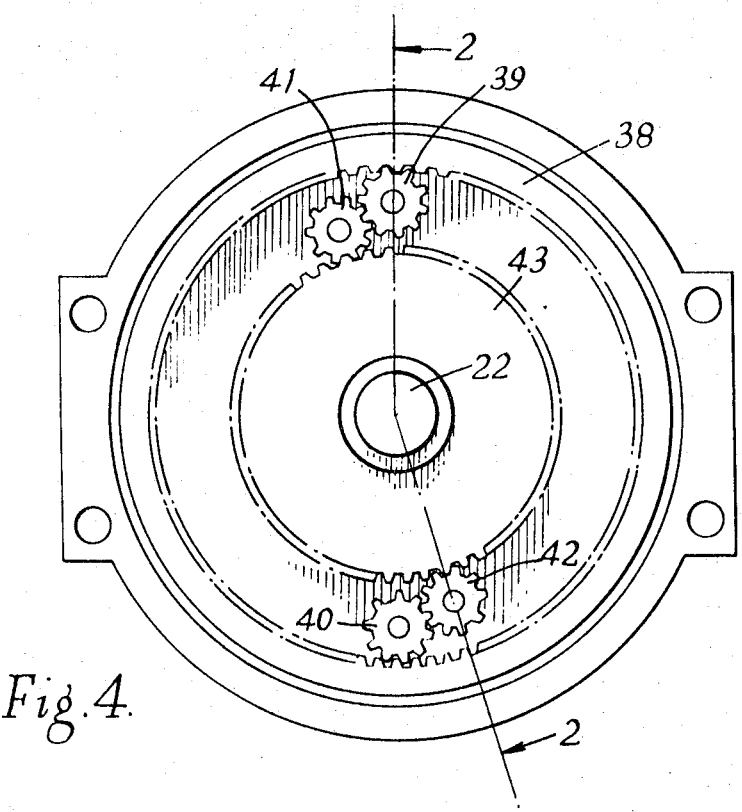
FIG. 4 is a sectional view thereof on the line 4–4 on FIG. 2.

The apparatus comprises a fixed trough shaped casing 10 mounted at an angle of about 30° to the horizontal on supports 11, 12 the latter being attached to the casing by a pivot 13 so that the casing can be tilted for cleaning when the support 11 is detached. The lower part of the casing is of semicylindrical cross section.

Passing through the two end walls of the casing are sleeves 15, 16 respectively. The sleeve 15 is mounted for rotation in a bearing 17 located outside the casing. Inside the casing the sleeves 15, 16 carry plates 18, 19 to which the opposite ends of a helix 20 are fixed. Passing through the casing and through the sleeves is a tube 22 one end of which is mounted for rotation in a bearing 23 located outside the casing adjacent bearing 17. The inside of the tube 22 is divided by a wall 24 into a water receiving chamber 25 and a foam receiving chamber 26. The water and foam escape from these chambers into the casing through holes 28 in the tube. A water supply pipe 29 is connected to the lower end of the tube 22. Passing into the lower end of the tube is a foam supply pipe 30 which passes through the wall 24 to feed into the foam chamber 26. Liquid seals such as 31 are provided where required. The tube has plates 34, 35 fixed to it at opposite ends of the casing and to these are fixed the opposite ends of a second or inner helix 36 located within the outer helix 20.

Fixed to the upper end of the casing is a gear housing 37 which contains an internally toothed ring gear 38 which is fast with the sleeve 16 and with which two pinions 39, 40 are in mesh. These mesh with further pinions 41, 42, which mesh with a sunwheel 43 carried by a hub 44 that passes through the end cover plate of the gear housing and is fixed to the tube 22. The tube 22 is driven by a motor.

The casing has a discharge opening 50 at its upper end. A loose lid 51 may be provided.

The helices may be wound in the same direction or in opposite directions. If wound in the same direction they must rotate at different speeds but if wound in opposite directions they may rotate at the same or at different speeds. Preferably the outer helix is rotated at a less speed than the inner helix e.g. in one example the outer helix rotates at 100 r.p.m. and the inner helix rotates at 133 r.p.m., these helices being wound in the same direction.

The helices may be made of flat bar as shown or may be round bar.

Between adjacent helices there is a continuous relative axial reciprocation so that the space between them is constantly opening and closing.

In the example water is mixed with foam but other materials may be mixed additionally or alternatively e.g. sand and cement.

I claim:

1. A continuous mixing apparatus comprising: an elongate casing inclined at an acute angle to the horizontal, an inlet at the lower end thereof, an outlet at the upper end thereof; two rotatably mounted helices one within the other located within the casing and wound in the same direction as each other, a first pair of rotary support means supporting the outer helix solely at its ends, a second pair of rotary support means supporting the inner helix solely at its ends, said outer and inner helices being supported solely by said pairs of support means; the first pair of support means and the outer helix forming a first rotary device; and the second pair of support means and the inner helix forming a second rotary device; said devices being relatively rotatable, means for rotating said devices in the same direction with the inner helix rotating faster than the outer helix, the arrangement being such that as the helices rotate the axial distance between adjacent points on the helices continuously varies so as to mix the materials in the casing and convey them to the outlet.

2. A mixing apparatus as claimed in claim 1 having a perforated tube extending through the casing and through the helices to which tube the inner helix is fixed solely at its ends.

3. A mixing apparatus as claimed in claim 2 wherein the tube is divided diametrically by an internal wall into first and second chambers and a pipe enters one end of the tube and passes through said wall, means being provided to feed one mixture ingredient to the first chamber surrounding said pipe while said pipe feeds another ingredient to the second chamber.

4. Apparatus as claimed in claim 1 in which the helices are of the same pitch.

5. A method of mixing water, sand and cement with water and a foaming agent comprising: (a) feeding said cement water and foaming agent to the lower end of a casing; (b) rotating the inner parts of said materials to be mixed at a greater speed than the outer parts of said materials in the same direction; (c) transferring at least part of the mixture through a helical gap of constantly varying width; (d) and discharging the mixture at the upper end of the casing.